United States Patent [19]

Yamamoto et al.

[11] Patent Number: 4,744,219

[45] Date of Patent: May 17, 1988

[54] MASTER CYLINDER

[75] Inventors: Kouji Yamamoto; Hiroaki Takeuchi, both of Toyota, Japan

[73] Assignee: Aisin Seiki Kabushiki Kaisha, Aichi, Japan

[21] Appl. No.: 898,802

[22] Filed: Aug. 21, 1986

Related U.S. Application Data

[63] Continuation of Ser. No. 639,217, Aug. 9, 1984, abandoned.

[30] Foreign Application Priority Data

Aug. 31, 1983 [JP] Japan ............................ 58-135134[U]

[51] Int. Cl.$^4$ ............................................. B60T 11/08
[52] U.S. Cl. ........................................ 60/578; 60/588; 4/B60T
[58] Field of Search .................. 60/578, 574, 585, 588

[56]  References Cited

U.S. PATENT DOCUMENTS

| | | | |
|---|---|---|---|
| 4,208,881 | 6/1980 | Brademeyer et al. | 60/578 |
| 4,372,117 | 2/1983 | Kobayashi | 60/578 |
| 4,445,334 | 5/1984 | Derrick | 60/578 |
| 4,483,145 | 11/1984 | Takeuchi et al. | 60/578 |

FOREIGN PATENT DOCUMENTS

| | | | |
|---|---|---|---|
| 28038 | 3/1981 | Japan | 60/578 |
| 48106 | 6/1981 | Japan | 60/578 |
| 63562 | 4/1983 | Japan | 60/578 |

Primary Examiner—Abraham Hershkovitz
Attorney, Agent, or Firm—Finnegan, Henderson, Farabow, Garrett and Dunner

[57]   ABSTRACT

A master cylinder has a piston slidably fitted in a stepped cylinder bore including a first pressure chamber connected through a coupling hole to a reservoir. When a fluid pressure in the first pressure chamber is increased to a predetermined level at the time the piston is moved forward, a second valve disposed in the coupling hole is opened to release a fluid pressure from the first pressure chamber into the reservoir. When a negative pressure is developed in the first pressure chamber as the piston is moved back, a first valve in the coupling hole is opened to supply a fluid from the reservoir into the first pressure chamber. The first valve comprises an annular plate fixedly mounted in the coupling hole, a valve body housing the second valve and disposed concentrically with respect to the plate, a spring disposed between an upper portion of the valve body and an upper portion of the plate, and seal member fixed to a lower portion of the plate, the valve body having a flange engageable with the seal member.

1 Claim, 5 Drawing Sheets

MASTER CYLINDER

This application is a continuation of application Ser. No. 639,217, filed Aug. 9, 1984, now abandoned.

BACKGROUND OF THE INVENTION

1. Field of the Invention

The present invention relates to a master cylinder for use in a fluid-pressure brake device in a motor vehicle, and more particularly to a master cylinder for discharging a large quantity of fluid under low pressure during an initial period of its operation stroke and for successively producing high fluid pressure.

2. Description of the Prior Art

One known master cylinder of the type described is disclosed in U.S. Pat. No. 4,208,881. As shown in FIG. 1 of the accompanying drawings, the disclosed master cylinder includes a cylinder body having a stepped bore formed with a larger diameter section B and a smaller diameter section C. A piston D slidable in the stepped bore is of a stepping piston having a larger diameter head E and a smaller diameter head F. The larger diameter bore section B defines therein a first pressure chamber G and the smaller diameter bore section C defines therein a second pressure chamber H. When a negative pressure is developed in the first pressure chamber G, a first valve I is opened to allow a fluid to flow from a reservoir J through a port K into the first pressure chamber G. When the pressure in the first pressure chamber G exceeds a predetermined level, a second valve L is opened to draw the fluid into the reservoir J. The pressure difference between the first and second pressure chambers G, H causes the fluid to flow from the first pressure chamber G into the second pressure chamber H around the outer peripheral lip of a cup seal M mounted on the smaller diameter head F of the piston D.

The first valve I is closed when a peripheral wall Na of a member N made of rubber or other elastomeric material is sealingly engaged by an inner peripheral wall surface of a coupling hole Q in the cylinder body A. As a negative pressure is created in the first pressure chamber G, the peripheral wall Na is elastically deformed to permit the fluid to flow from the reservoir J into the first pressure chamber G through a gap formed between the peripheral wall Na and the inner peripehral wall surface of the coupling hole Q. When the ambient temperature around the master cylinder is lowered, the member N of rubber or other elastomeric material is hardened to the extent that even when the negative pressure in the first pressure chamber G reaches the predetermined level, the first valve I is not opened with the resulting danger of admitting air into the first pressure chamber G. To prevent such a problem from occurring, it has been necessary to provide a complete seal between a seal member P fitted over the larger diameter section E of the piston D and an inner peripheral surface of the larger diameter bore section B. Accordingly, the parts are required to be of a high accuracy, and the seal member P has to be of a special design.

SUMMARY OF THE INVENTION

It is an object of the present invention to provide a master cylinder including a first valve which can be opened without being influenced by an ambient temperature.

To achieve the above object, a master cylinder has a first valve comprising an annular plate fixedly mounted in a coupling hole by which a first pressure chamber is connected to a reservoir, a valve body housing a second valve and disposed concentrically with respect to the plate, a spring disposed between an upper portion of the valve body and an upper portion of the plate, and seal member fixed to a lower portion of the plate, the valve body having a flange engageable with the seal member.

The first valve is actuated when the seal member and the valve body which are arranged axially in the coupling hole are brought into and out of engagement with each other. The pressure at which the first valve opens is determined by the spring, and will not be subjected to variations even when the seal member is hardened due to a low ambient temperature. The fluid does not flow through a gap which would be produced between an outer wall surface of the seal member and an inner peripheral wall surface of the coupling hole, but flows in a large passage through the first and second valves. Therefore, the master cylinder operates with an increased degree of response.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
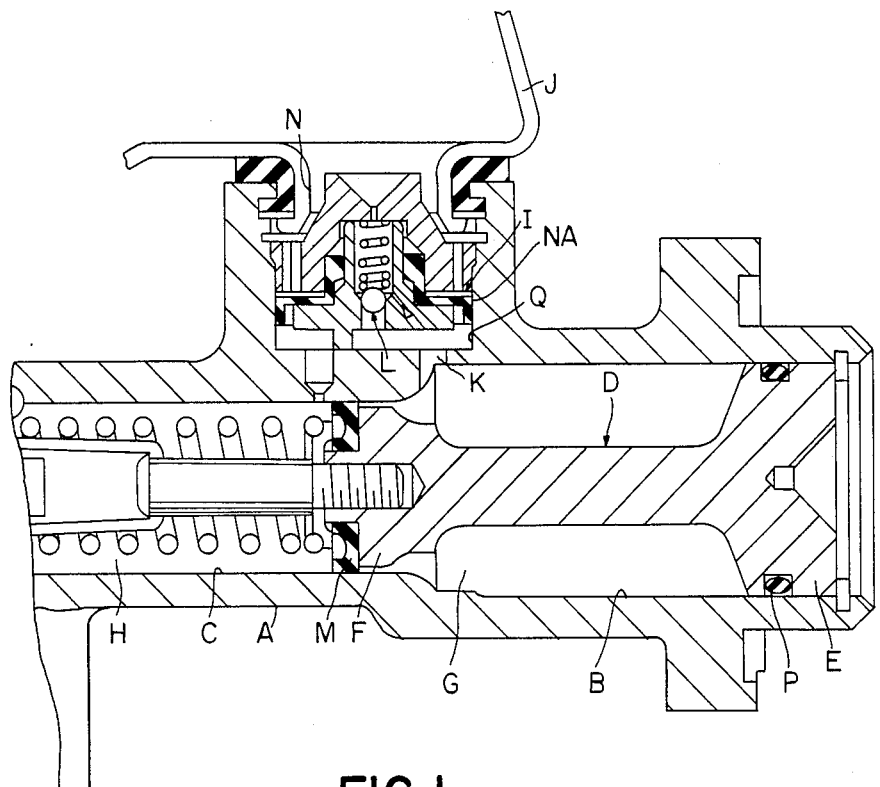
FIG. 1 is a fragmentary cross-sectional view of a conventional master cylinder.

A master cylinder according to an embodiment of the present invention will be described with reference to FIGS. 2 and 3.

The master cylinder includes a cylinder body 10 having a stepped bore composed of a larger diameter section 10a and a smaller diameter section 10b. A first piston 11 comprises a larger diameter head 11a slidably fitted in the larger diameter bore section 10a and a smaller diameter head 11b slidably fitted in the smaller diameter bore section 10b. A second piston 12 is also slidably fitted in the smaller diameter bore section 10b. The cylinder body 10 has an annular groove 13 defined in an inner peripheral surface near an open end thereof and receiving a retainer 14 fitted therein which serves to define a return position of the first piston 11. Cup seals 15, 16 are mounted respectively on the larger and smaller diameter heads 11a, 11b of the first piston 11. The first piston 11, and the cup seals 15, 16 cooperate with each other in defining a first pressure chamber 17 in the larger diameter bore section 10a.

The smaller diameter head 11b of the first piston 11 and the second piston 12 define therebetween a second pressure chamber 18 in the smaller diameter bore section 10b. A fourth pressure chamber 20 is defined between the second piston 12 and an end wall 10c of the smaller diameter bore section 10b. A third pressure chamber 19 is defined around the second piston 12. The smaller diameter head 11b of the first piston 11 has axial holes 11c for passage therethrough of a fluid from the first pressure chamber 17 into the second pressure chamber 18. The cup seal 16 is arranged to allow fluid flow from the first pressure chamber 17 into the second pressure chamber 18 due to a smaller pressure difference between the first and second pressure chambers 17, 18.

Figure 2:
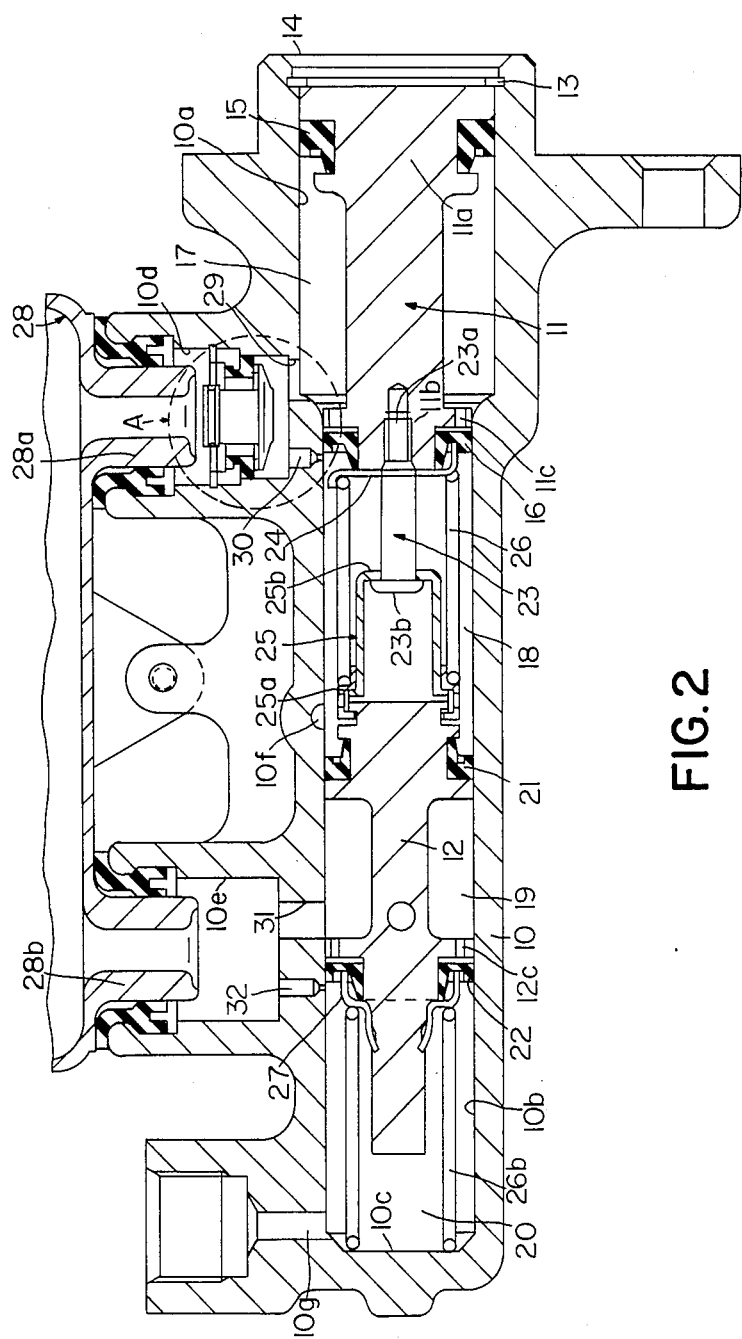
FIG. 2 is a cross-sectional view of a master cylinder according to an embodiment of the present invention.

A cup seal 21 is mounted on a righthand end as viewed in FIG. 2 of the second piston 12 which is closer to the first piston 11 for preventing the fluid from flowing from the second pressure chamber 18 into the third pressure chamber 19. A lefthand end as viewed in FIG. 2 of the second piston 12 closer to the end wall 10c has axial holes 12c defined therein and supports thereon a cup seal 22, which is arranged to allow the fluid to pass from the third pressure chamber 19 into the fourth pressure chamber 20 due to a small pressure difference between the fourth pressure chamber 20 and the third pressure chamber 19.

A rod 23 positioned in the second pressure chamber 18 has a righthand threaded end portion 23a threaded into the first piston 11 with a retainer 24 fixedly clamped between the rod 23 and the first piston 11. A retainer 25 has a radially outward flange 25a at a lefthand end thereof and a radially inward flange 25b at a righthand end thereof as viewed in FIG. 2. The retainer 25 is slidable on and along the rod 23 until the radially inward flange 25b engages a head 23b of the rod 23.

A first spring 26 is disposed under compression between the retainer 24 and the radially outward flange 25a of the retainer 25. A second spring 266 is disposed under compression between a retainer 27 secured to the lefthand end of the second piston 12 and the end wall 10c of the bore. The second spring 266 has a spring force which is smaller than that of the first spring 26, but large enough to move the first piston 11 and the second piston 12. Under normal conditions in which the first piston 11 is in its rearward position and not pushed to the left to its forward position, the first piston 11 is kept in contact with the retainer 24, with the second piston 12 in the leftmost position with respect to the rod 23. Therefore, the first piston 11 and the second piston 12 remain in its right or rearward position positioned as shown in FIG. 2 under normal condition.

The cylinder body 10 has a first coupling hole 10d in which a tube 28a of a reservoir 28 is inserted and a second coupling hole 10e in which a tube 28b of the reservoir 28 is inserted, the first and second coupling holes 10d, 10e being defined in an upper portion of the cylinder body 10. The first coupling hole 10d is positioned near a junction between the larger diameter bore section 10a and the smaller diameter bore section 10b. Through a bottom of the first coupling hole 10d, there is defined a communication port 29 kept in fluid communication with the first pressure chamber 17; and a compensation port 30 kept in fluid communication with the second pressure chamber 18. Likewise, through a bottom of the second coupling hole 10e, there is defined a communication port 31 kept in fluid communication with the third pressure chamber 19 and a compensation port 32 kept in fluid communication with the fourth pressure chamber 20. The cylinder body 10 also has an outlet port 10f through which the liquid pressure is released from the second pressure chamber 18; and an outlet port 10g through which the liquid pressure is released from the fourth pressure chamber 20.

Figure 3:
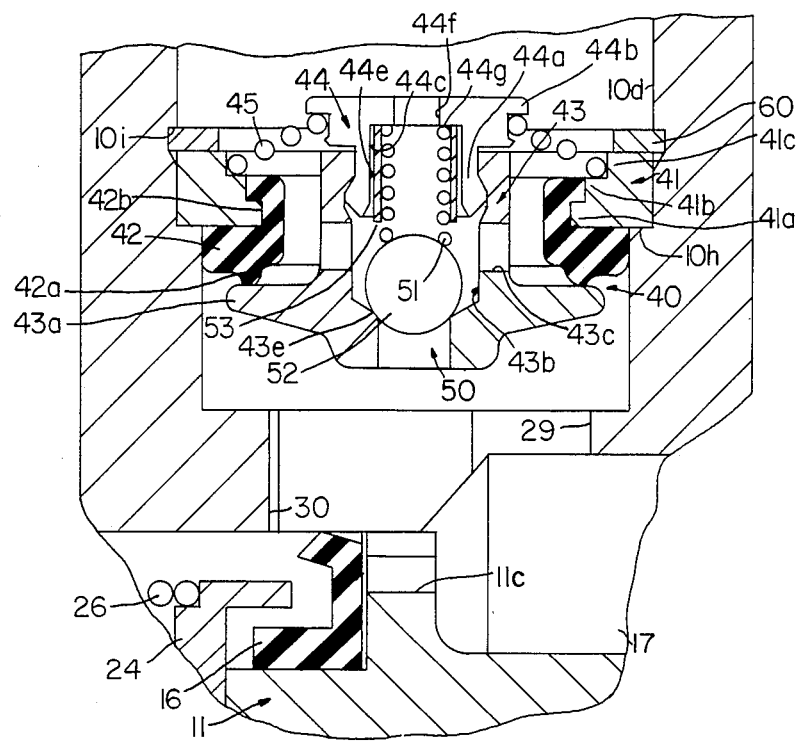
FIG. 3 is an enlarged fragmentary cross-sectional view showing a portion enclosed by a circle A in FIG. 2.

As shown in FIG. 3 in greater detail, a first valve 40 and a second valve 50 are disposed in the first coupling hole 10d. The first valve 40 serves to allow the fluid to flow from the reservoir 28 (see FIG. 2) into the first pressure chamber 17 when a negative pressure is developed in the first pressure chamber 17. The second valve 50 is opened when the pressure in the first pressure chamber 17 exceeds a predetermined level, and thus serves to define a maximum fluid pressure in the first pressure chamber 17. More specifically, the first coupling port 10d has on its inner peripheral surface a lower shoulder 10h on which a plate 41 is placed. The plate 41 is of an axially stepped configuration including a lower step 41a, a middle step 41b, and an upper step 41c. The plate 41 is prevented from being dislodged out of position by a snap ring 60 interposed between the upper step 41c and an upper shoulder 10i defined on the inner peripheral surface of the first coupling hole 10d.

A seal member 42 has an annular lip 42a on a lower surface thereof and an annular groove 42b. The seal member 42 is fixed to the plate 41 with the lower step 41a of the plate 41 being fitted in the annular groove 42b. A valve body 43 is disposed concentrically with respect to the seal member 42 and has an annular flange 43a projecting radially outwardly in confronting relation to the annular lip 42a of the seal member 42. The valve body 43 also has an axially stepped hole 43b having open ends and a radial hole 43c communicating with the hole 43b.

A cap 44 has a shank 44a fitted in the upper open end of the valve body 43. A conical spring 45 is placed under compression between a head 44b of the cap 44 and the middle step 41b of the plate 41 for normally urging the valve body 43 to move in an upward direction so that the annular flange 43a is held in sealing engagement with the annular lip 42a. The load imposed by the conical spring 45 is selected such that the valve body 43 will move downwardly when the negative pressure in the first pressure chamber 17 reaches a predetermined level. Therefore, the load by the conical spring 45 determines the pressure at which the first valve 40 opens and supports the valve body 43.

The cap 44 has an axially stepped hole 44c defined therethrough and including a larger diameter section 44e and a smaller diameter section 44f divided by a shoulder 44g therebetween. A spring 51 has an upper end engaged by the shoulder 44g and a lower end held against a ball 52 to urge the latter in a direction to be held in a sealing engagement with a seat or tapered surface 43e of the hole 43b in the valve body 43. The spring 51 is protected by a collar surrounding the same. When the pressure in the first pressure chamber 17 exceeds a predetermined level, the ball 53 is lifted off the seat 43e against the force of the spring 51. Thus, the load imposed by the spring 51 determines the pressure at which the second valve 50 opens.

Operation of the master cylinder of the foregoing construction is as follows: When a car in which the master cylinder is incorporated is braked, the force with which the brake pedal is depressed is transmitted to the first piston 11, which is then slid forwardly to the left (FIG. 2) with the second piston 12. The compensation port 30 is now closed by the cup seal 16 and the compensation port 32 by the cup seal 22. The the second and fourth pressure chambers 18, 20 are shut off from fluid communication with the reservoir 28. As the first piston 11 is further actuated, the fluid pressure in the first and second pressure chambers 17, 18 is increased, and the fluid pressure in the fourth pressure chamber 20 is also increased. When the fluid pressure in the first pressure chamber 17 becomes higher than that in the second pressure chamber 18, the fluid is forced to flow from the first pressure chamber 17 through the holes 11c and around the outer peripheral surface of the cup seal 16 into the second pressure chamber 18. The fluid is now supplied from the second pressure chamber 18 through an outlet port 10f into a wheel brake cylinder (not shown). Since the first pressure chamber 17 is completely shut off from the reservoir 28 at this time, the quantity of fluid flowing from the first pressure chamber 17 into the second pressure chamber 18 is not influenced by the speed at which the first piston 11 is actuated.

As the fluid pressure in the first pressure chamber 17 is increased with the fluid pressure in the second pressure 18 until it exceeds a predetermined level, the ball 52 is lifted off the seat 43e to open the second valve 50, thus permitting the fluid to escape from the first pressure chamber 17 into the reservoir 28 to prevent the fluid pressure in the first pressure chamber 17 from being unduly raised. As a consequence, an increase in the force with which the brake pedal is depressed and which is transmitted to the first piston 11 is effective in increasing the fluid pressure in the second pressure chamber 18, thus raising the fluid pressures in the second and fourth pressure chambers 18, 20.

When the brake pedal is released, the first piston 11 and the second piston 12 return to their original positions under the force from the springs 26, 26b. If a negative pressure is developed in the first pressure 17 at this time, then the valve body 43 is lowered against the force of the spring 45 due to a pressure difference between the first pressure chamber 17 and the reservoir 28. The annular flange 43a of the valve body 43 is then disengaged from the annular lip 42a of the seal member 42, thus opening the first valve 40 to admit the fluid from the reservoir 28 into the first pressure chamber 17.

If a negative pressure is developed in the second pressure chamber 18, then the fluid flows from the first pressure chamber 17 through the holes 11c and around the outer peripheral surface of the cup seal 16 into the second pressure chamber 18. If a negative pressure is developed in the fourth pressure chamber 20, then the fluid flows from the third pressure chamber 19 through the holes 12c and around the outer peripheral surface of the cup seal 22 into the fourth chamber 20.

As described above, the first valve 40 is opened by lowering the valve body 43 housing the second valve 50 therein, in an axial direction of the coupling hole 10d, thereby ensuring a large area through which the fluid can flow. Since the pressure at which the first valve 40 opens is determined by the spring 45, the pressure is not influenced by an ambient temperature.

Figure 4:
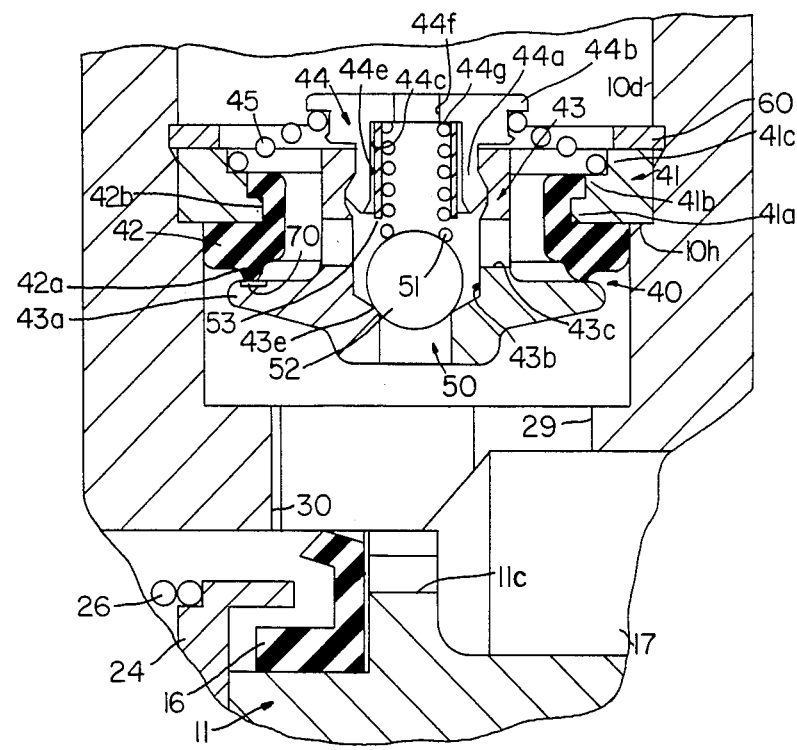
FIG. 4 is a view similar to FIG. 3, showing a modification according to the present invention.
Figure 5:
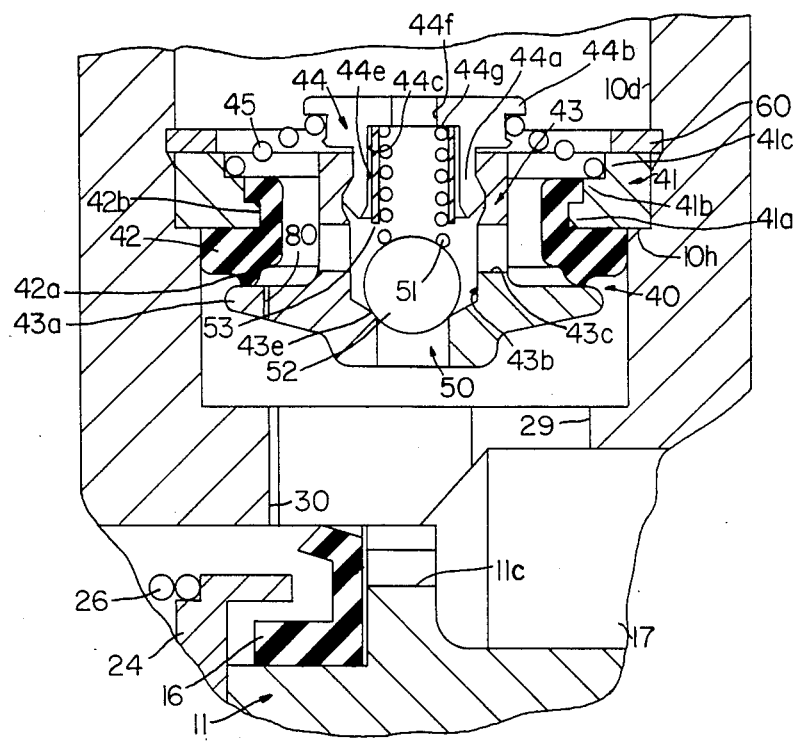
FIG. 5 is a view similar to FIG. 3, showing another modification according to the present invention.

As shown in FIG. 4, a restriction passage 70 may be defined in a surface of the flange 43a of the valve body 43, or as shown in FIG. 5, a restriction passage 80 may be defined axially through the flange 43a of the valve body 43. The restriction passage 70 or the passage 80 shown in respective FIGS. 4 or 5 allows fluid communication between the first pressure chambers 17 and the reservoir 28 at all times, so that any expansion of the fluid in the first pressure chamber 17 due to an increase in the ambient temperature can be released into the reservoir 28.

While in the foregoing embodiments the present invention has been shown as being incorporated in a tandem master cylinder, the invention is also applicable to a single master cylinder having no second piston.

Although certain preferred embodiments have been shown and described, it should be understood that many changes and modifications may be made therein without departing from the scope of the appended claims.

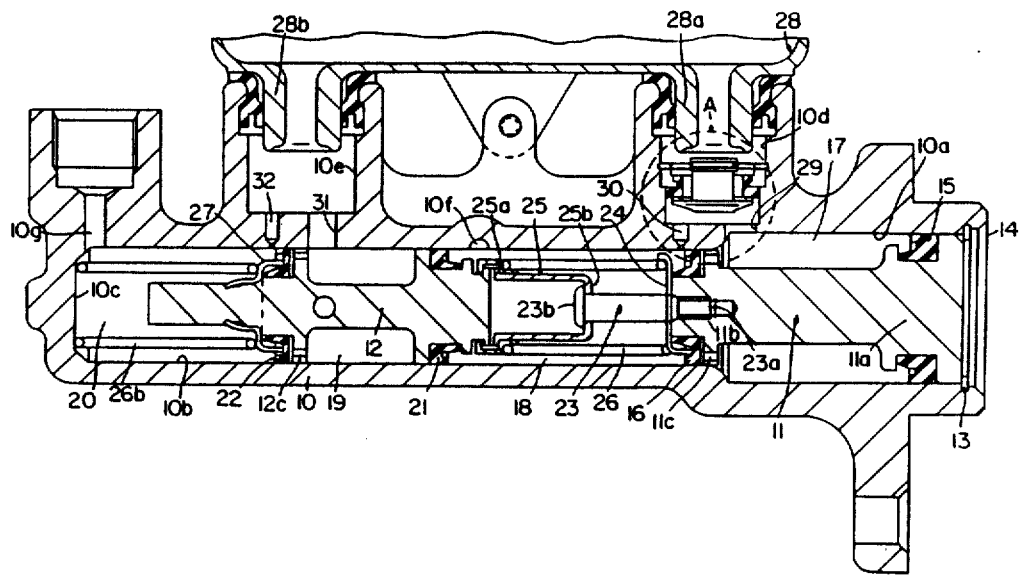

What is claimed is:
1. A master cylinder comprising:
   (a) a cylinder body having a stepped bore including larger and smaller diameter sections;
   (b) a stepped piston having larger and smaller diameter heads slidably fitted respectively in said larger and smaller diameter sections defining a first pressure chamber and a second pressure chamber, said second chamber having an outlet port, said cylinder body having a coupling hole defined in the vicinity of a junction between said larger and smaller diameter sections of said bore for connection to a reservoir, and communication and compensation ports defined in a bottom of said coupling hole and communicating with said first and second chambers, said smaller diameter head of said piston supporting therearound a cup seal for closing communication between said second pressure chamber and said compensation port when said piston is moved to a forward position;
   (c) a first valve disposed in said coupling hole and openable for allowing a fluid to flow from the reservoir into said first pressure chamber in response to a negative pressure developed in said first chamber at the time said piston moves rearwardly from a forward position;
   (d) a second valve disposed in said coupling hole and openable for allowing fluid to be released from said first pressure chamber into the reservoir in response to a pressure in said first pressure chamber exceeding a predetermined level at the time said piston is moved to a forward position; and
   (e) said first valve including an annular plate fixedly mounted in said coupling hole of the cylinder body, an annular sealing member fixedly attached to said plate, said sealing member having a radially extending surface, an annular lip projecting from said surface, a valve body having an outwardly extending flange adjacent one end thereof, said valve body housing said second valve and disposed concentrically with respect to said plate and said sealing member, said flange having an opposing seating surface positioned to sealingly engage said annular lip at times when the first valve is in a closed position, said opposing seating surface of the flange having a groove forming a restricted passage therein positioned to be beneath said annular lip, said annular lip being urged normally into said groove increasing the restriction thereof while said first valve is closed during pressure level increase in said first pressure chamber, prior to reaching said predetermined pressure level and the opening of said second valve, in response to said piston movement, said groove extending along the seating surface beyond both sides of said annular lip to provide restrictive fluid communication between the reservoir and said first pressure chamber to release fluid into the reservoir in response to an increase in fluid pressure caused by ambient temperature increase at times when the first and second valves are in a closed position, and a spring disposed between an upper portion of said valve body on an upper portion of said plate to normally keep said first valve in a closed position.

* * * * *

UNITED STATES PATENT AND TRADEMARK OFFICE
CERTIFICATE OF CORRECTION

PATENT NO. : 4,744,219

DATED : May 17, 1988

INVENTOR(S) : Kouji Yamamoto et al

Page 1 of 2

It is certified that error appears in the above-identified patent and that said Letters Patent is hereby corrected as shown below:

Title page should be deleted to appear as per attached title page.

Signed and Sealed this

Seventeenth Day of January, 1989

Attest:

DONALD J. QUIGG

*Attesting Officer*

Commissioner of Patents and Trademarks

United States Patent [19]

Yamamoto et al.

[11] Patent Number: 4,744,219
[45] Date of Patent: May 17, 1988

[54] MASTER CYLINDER

[75] Inventors: Kouji Yamamoto; Hiroaki Takeuchi, both of Toyota, Japan

[73] Assignee: Aisin Seiki Kabushiki Kaisha, Aichi, Japan

[21] Appl. No.: 898,802

[22] Filed: Aug. 21, 1986

Related U.S. Application Data

[63] Continuation of Ser. No. 639,217, Aug. 9, 1984, abandoned.

[30] Foreign Application Priority Data

Aug. 31, 1983 [JP] Japan ............................ 58-135134[U]

[51] Int. Cl.⁴ ............................................... B60T 11/08
[52] U.S. Cl. ...................................... 60/578; 60/588; 4/B60T
[58] Field of Search ................... 60/578, 574, 585, 588

[56] References Cited

U.S. PATENT DOCUMENTS

| | | | |
|---|---|---|---|
| 4,208,881 | 6/1980 | Brademeyer et al. | 60/578 |
| 4,372,117 | 2/1983 | Kobayashi | 60/578 |
| 4,445,334 | 5/1984 | Derrick | 60/578 |
| 4,483,145 | 11/1984 | Takeuchi et al. | 60/578 |

FOREIGN PATENT DOCUMENTS

| | | | |
|---|---|---|---|
| 28038 | 3/1981 | Japan | 60/578 |
| 48106 | 6/1981 | Japan | 60/578 |
| 63562 | 4/1983 | Japan | 60/578 |

Primary Examiner—Abraham Hershkovitz
Attorney, Agent, or Firm—Finnegan, Henderson, Farabow, Garrett and Dunner

[57] ABSTRACT

A master cylinder has a piston slidably fitted in a stepped cylinder bore including a first pressure chamber connected through a coupling hole to a reservoir. When a fluid pressure in the first pressure chamber is increased to a predetermined level at the time the piston is moved forward, a second valve disposed in the coupling hole is opened to release a fluid pressure from the first pressure chamber into the reservoir. When a negative pressure is developed in the first pressure chamber as the piston is moved back, a first valve in the coupling hole is opened to supply a fluid from the reservoir into the first pressure chamber. The first valve comprises an annular plate fixedly mounted in the coupling hole, a valve body housing the second valve and disposed concentrically with respect to the plate, a spring disposed between an upper portion of the valve body and an upper portion of the plate, and seal member fixed to a lower portion of the plate, the valve body having a flange engageable with the seal member.

1 Claim, 5 Drawing Sheets